Feb. 19, 1957 H. O. LEWIS 2,782,362

PEAK VOLTAGE REGULATOR

Filed Dec. 29, 1955

INVENTOR.
HERBERT O. LEWIS
BY Moody and Goldman
ATTORNEYS

United States Patent Office 2,782,362

Patented Feb. 19, 1957

2,782,362

PEAK VOLTAGE REGULATOR

Herbert O. Lewis, Burbank, Calif., assignor to Collins Radio Company, Cedar Rapids, Iowa, a corporation of Iowa Application December 29, 1955, Serial No. 556,142

6 Claims. (Cl. 323—45)

This invention relates to an alternating-voltage regulator which maintains an alternating output voltage at a substantially constant peak amplitude without regard to the waveform of the voltage.

Furthermore, the invention can maintain virtually identical waveforms between an unregulated input alternating voltage and an output alternating voltage, regulated for constant peak amplitude.

Conventionally, peak clippers are sometimes used to maintain a constant amplitude for an alternating electrical wave; however, such devices distort the output waveform and also have low efficiency when substantial power is involved.

It is the primary object of this invention to provide an alternating voltage regulator that maintains the peak values of a voltage wave at a substantially constant value, although relatively large amounts of regulated power may be involved.

It is another object of this invention to provide a peak voltage regulator which can have a low output impedance.

The invention utilizes as a monitoring means a high input impedance clipper circuit that samples the output wave and senses variations in its peak values. The monitor circuit compares the sampled wave to a predetermined voltage level, which is obtained with the assistance of a very low-power constant direct-voltage source, such as may be obtained with a voltage regulator tube or a battery. The monitor circuit conducts only during the peak portions of the output voltage, which exceed the preset voltage limit. The high input impedance of the monitor circuit prevents it from having any substantial distorting effect upon the output voltage waveform.

The monitor circuit may clip either positive or negative peaks of the alternating wave; and it is followed by an amplifier which amplifies the clipped peaks. The amplifier output provides peaks with a negative polarity. Where a single stage grounded-cathode amplifier is used, which is phase-inverting, positive peaks of the sensed wave are clipped to provide the required negative output polarity. The gain of this amplifier determines the percentage-of-regulation of the system.

A peak detector receives the negative amplified peaks and rectifies them to provide a negative direct-voltage output with a value determined by the amplitude of the negative peaks.

A variable-gain amplifier is connected to the peak detector and has its gain controlled by the negative direct-voltage detector output.

The variable-gain amplifier also receives, as an input, a sample of the regulated output voltage. The sampled voltage is amplified with a gain controlled by the peak detector output.

The amplified output of the variable-gain amplifier is combined serially with the unregulated input voltage to provide the regulated output voltage. The output voltage of the variable-gain amplifier varies oppositely from voltage variations in the input voltage to compensate for changes in the input voltage.

Further objects, features and advantages will be apparent to a person skilled in the art upon further study of this specification and drawings, in which.

Figure 1:
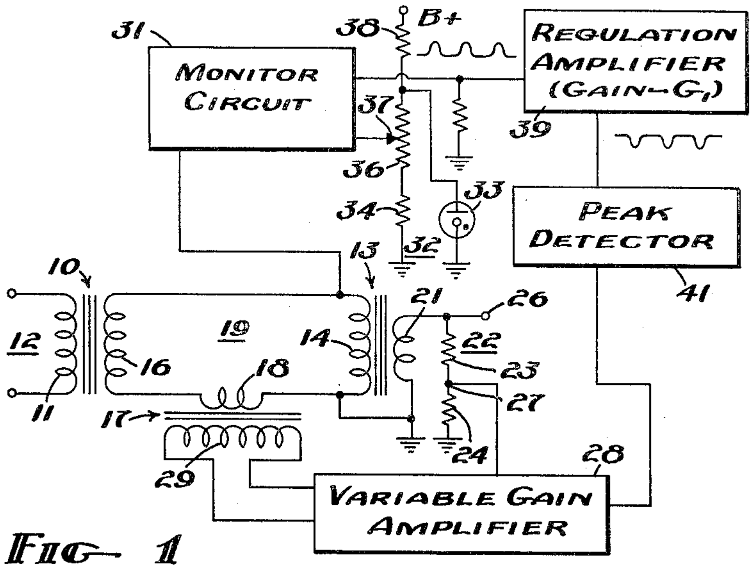
Figure 1 is a partial block diagram of one form of the invention.

Now referring to the invention in more detail, Figure 1 shows a generic form of the invention which includes an input transformer 10 having a primary 11 that is connected to an unregulated alternating-voltage source 12. An output transformer 13 has a primary 14 connected serially to the secondary 16 of input transformer 10. And, a compensating transformer 17 has a secondary 18 connected in series with secondary 16 and primary 14 to provide a complete circuit 19. Also, primary 14 and secondary 21 of output transformer 13 each have one end connected to ground.

The invention includes two feedback loops with respect to circuit 19. One feedback loop provides the alternating waveform for the feedback compensating voltage; and the second loop controls the amplitude of the feedback compensating voltage in a manner that obtains the required regulation.

The first feedback loop includes a voltage divider 22, a variable-gain amplifier 28, and compensating transformer 17. Voltage divider 22 comprises a pair of serially connected resistors 23 and 24 connected across the secondary of output transformer 13. Divider 22 could also be connected across the primary of output transformer 13.

The input impedance of voltage divider 22 is large compared to the load and, accordingly, does not take a substantial amount of regulated power output of the invention.

Voltage-divider 22 is tapped at a point 27, which is connected to the input of a variable-gain amplifier 28. Variable-gain amplifier 28 may include substantial power amplification, depending on the power requirements, to obtain regulation, which also depends on the amount of variation in the unregulated input voltage. The output of variable-gain amplifier 28 is connected to the primary 29 of compensating transformer 17.

The second feedback loop includes a monitor circuit 31, an amplifier 39, a peak detector 41, and the components of the first feedback loop. Monitor circuit 31 has its input connected acros the primary 14 of output transformer 13, but it could also be connected across the secondary 21. Monitor 31 may be of the conventional diode-type peak-clipper circuit and may have a high input impedance so that it does not distort the input waveform.

Monitor circuit 31 requires a direct-voltage of fixed value to obtain a stable clipping level; and this is obtained with a regulator circuit 32, which includes a voltage regulator tube 33. A resistor 34, which has one end grounded, and a potentiometer 36 are connected in series across gas tube 33. A resistor 38 is connected between regulator tube 33 and a B-plus source. The tap 37 of potentiometer 36 is connected to monitor circuit 31 and provides an adjustable level that is stable.

Monitor circuit 31 conducts only during the peaks of the regulated output wave; and circuit 31 passes only the peaks of the input waves which exceed the voltage at tap 37. The peaks may have either positive or negative polarity with respect to ground depending on the polarity of clipping. However, it will be assumed for explanation purposes in Figure 1 that the output peaks of monitor circuit 31 have positive polarity.

An amplifier 39 receives the positive peaks of clipper circuit 31, amplifies them with a gain $G_1$, and phase inverts them to have negative output polarity. The gain $G_1$ of amplifier 39 controls the percentage-of-regulation of the system.

Peak detector 41 has its input connected to the output of phase-inverting amplifier 39 and detects the negative amplified peaks to provide a negative direct-voltage output, which has a value approximately equal to the amplitude of the negative pulsed output of amplifier 39. Accordingly, peak detector 41 might be a diode-detector circuit having a very long time constant.

Therefore, the negative direct-voltage output of peake detector 41 will vary with variation in amplitude of the regulated output voltage.

However, the variation in the output of peak detector 41 will be many times the variation of the regulated output voltage, due to the clipping and amplifying action of monitor 31 and amplifier 39. Monitor circuit 31 removes all but the peaks and, therefore, removes the non-variable portion of the alternating cycle and permits a large voltage variation in the amplified output with very small variations in the regulated voltage. It is this amplified variation that controls the gain of variable-gain amplifier 28 and, consequently, controls the amount of compensating output voltage provided by transformer 17. For example, variable-gain amplifier 28 may have a remote-cutoff tube, wherein its control grid bias is provided by the output of peak detector 41. Then, the gain of amplifier 28 will decrease with an increase in the negative output of detector 41, and vice-versa.

The secondary 18 of compensating transformer 17 is connected in series with secondary 16 of input transformer 10 so that their voltages are in phase and, therefore, add to provide the regulated output voltage.

In operating the invention, the peak amplitude of the output voltage is controlled by the setting of tap 37, which determines the sensing level of monitor circuit 31. The direct-voltage setting of tap 37 will be somewhat below the regulated peak amplitude of the alternating output voltage.

A stable condition will occur at each setting of tap 37 to provide a particular peak value of the output voltage. This occurs because the magnitude of the compensating voltage, injected by compensating secondary 18, acts oppositely and in the proper amount to maintain a constant peak value for the compensating voltage. Thus, a different setting of tap 37 provides a different value of regulated output voltage.

When the input voltage increases above the stable value, the clipped peaks increase accordingly to increase the negative bias-voltage output of peak detector 41. Thereby, a decrease occurs in the gain of variable-gain amplifier 28; and, consequently, the voltage output of compensating transformer 17 is decreased. The sum of the increased input voltage and decreased compensating voltage maintain the peak output voltage of the circuit at a substantially constant value, which is the stable value.

On the other hand, if the input voltage decreases below the predetermined value, the amplitude of the peaks provided at the output of monitor circuit 31 decreases; and, accordingly, the negative direct-voltage bias provided at the output of peak detector 41 decreases. Consequently, the gain of variable-gain amplifier 28 increases to provide a larger compensating voltage across secondary 18 of compensating transformer 17. The increased compensating voltage adds to the decreased input voltage to maintain the peak voltage across the output primary 14 at a substantially constant value.

Figure 2:
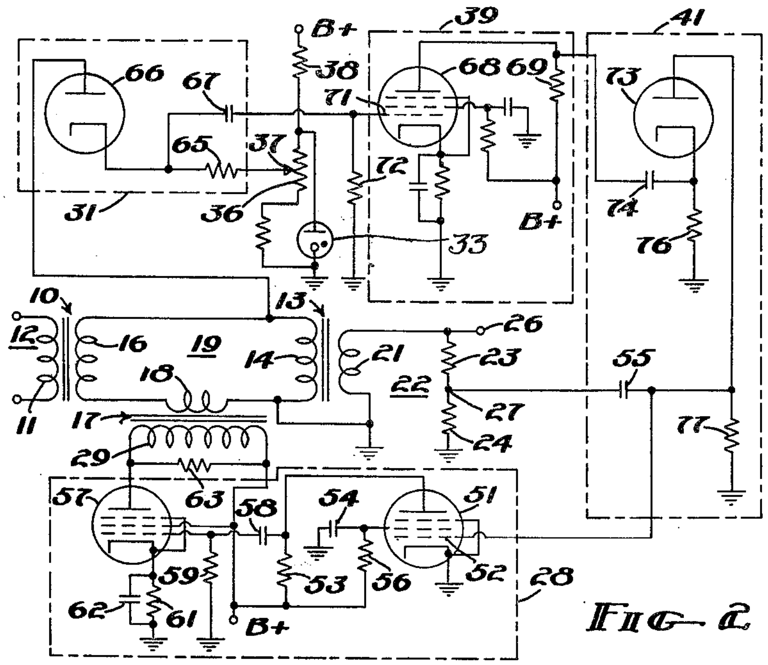
Figure 2 is a schematic diagram of a more detailed form of the invention.

Figure 2 shows a detailed schematic form of the invention in which detailed circuitry is illustrated for the block representations used in Figure 1. Components shown in Figure 1 are designated by the same reference numerals in Figure 2.

Variable-gain amplifier 28 includes a remote cutoff tube 51 which has a gain that varies with a negative bias applied to its control grid 52. Tube 51 is conventionally connected with its cathode connected to ground, its plate connected through a plate resistor 53 to the B-plus source, and its screen-grid connected to ground through a capacitor 54 and to the B-plus source through a resistor 56. The control grid of tube 51 is connected through a charging condenser 55 to tap point 27 on the output divider circuit 22. The operation of charging capacitor 55 will be explained below in connection with the gain control of amplifier 28.

A second pentode 57 is provided in amplifier 28 to increase its overall gain, and it may be a conventionally connected pentode tube which has its control grid connected through a blocking condenser 58 to the plate of pentode 51. A grid-leak resistor 59 is connected between ground and the control grid. A cathode resistor 61 is connected between ground and the cathode of tube 57; and a bypass capacitor 62 is connected across cathode resistor 61. The primary 29 of compensating transformer 17 is connected between the B-plus source and the plate of tube 57; and a resistor 63 is connected across primary 29.

Monitor circuit 31 comprises a diode 66, which might be one-half of a dual-diode tube, or might be a semiconductor diode. The plate of diode 66 is connected to the ungrounded side of output primary 14. A resistor 65 is connected serially between tap 37 of potentiometer 36 and the cathode of diode 66. Accordingly, diode 66 conducts only when the voltage of output primary 14 exceeds the positive fixed voltage at tap 37. Therefore, only the peak portions of the wave appear across the cathode resistance connected to diode 66 and are transmitted through a direct-current blocking capacitor 67 to amplifier 39. Accordingly, monitor circuit 31 provides output peaks having a positive polarity, and its cathode resistors have relatively large resistance to provide a high input impedance for the monitor circuit.

Regulating amplifier 39 comprises a pentode tube 68, which is conventionally connected with a biasing cathode resistor and a bypassing capacitor connected across it. A plate resistor 69 connects between a B-plus plate-voltage source and the plate of tube 68; while a screen-grid resistor connects between the B-plus source and the screen grid of pentode 68, and a capacitor grounds the alternating components of the screen grid. The suppressor grid of pentode 68 is connected to its cathode. Its control grid 71 is coupled to the output of monitor circuit 31 through blocking capacitor 67; and a grid-leak resistor 72 is connected between control grid 71 and ground. The clipped peaks are amplified by the gain $G_1$ of tube 68. The pulsed input to tube 68 is inverted in phase to provide output pulses having negative polarity.

Peak detector 41 includes a detector diode 73 which might be half of a dual diode, or might be a semiconductor diode. Diode 73 has its cathode connected to the plate of tube 68 through a blocking capacitor 74, which removes the direct-voltage component from the received negative pulses. A resistor 76 is connected between ground and cathode of diode 73 to enable actuation of detector diode 73 by the negative pulses. Another resistor 77 is connected between ground and the plate of diode 73 and receives the conduction current of the diode. A charging capacitor 55 is connected between the plate of diode 73 and point 27 of divider 22 and develops a direct-voltage which is approximately equal to the peak value of the pulses received by peak detector 41, and this voltage has a negative polarity, which provides the output of the peak detector.

Capacitor 55 and resistor 77 have a very long time constant so that little charge leaks off of capacitor 55 between peaks. Consequently, capacitor 55 obtains a negative charge that remains at a substantially constant direct-voltage, which is approximately equal to the received peak amplitudes. Hence, control grid 52 of tube 51 in variable-gain amplifier 28 is biased accordingly and has its gain varied accordingly.

The circuit shown in Figure 2 operates as described above for Figure 1. The gain of phase-inverting amplifier 39 may be controlled by the value of its plate resistor 69 in order to control the percentage-of-regulation for the circuit.

Where the single remote cutoff amplifier tube 51 provides sufficient gain, compensating primary 29 may be directly connected to its output without the requirement for an additional power tube, such as, tube 57.

It is noted that most of the power, which is regulated by this invention, passes directly from input transformer 10 to output transformer 13; and, accordingly, does not pass through the regulation control circuitry. Thus, only an incremental voltage is varied and fed back to maintain the constant peak output of the invention. Consequently, the invention will regulate its output for constant peak amplitude during wide load variation.

It is, therefore, apparent that this invention provides a circuit which regulates the peak value of an output voltage without regard to the waveform of the voltage, since peak detector 41 provides a regulating direct-voltage output equal only to the amplitude of the clipped peaks without regard to their duty cycle.

While a particular form of the invention has been shown and described, it is to be understood that the invention is capable of many modifications. Changes, therefore, in construction and arrangement may be made without departing from the full scope of the invention as given by the appended claims.

I claim:

1. Means for regulating the peak value of an alternating output voltage, comprising an input transformer, an output transformer, a compensating transformer, the secondary of said compensating transformer connected serially with the primary of said output transformer and the secondary of said input transformer, a first feedback loop comprising a variable-gain amplifier having an input received from said output transformer, and the primary of said compensating transformer connected to the output of said variable-gain amplifier, and a second feedback loop for controlling the gain of said variable-gain amplifier and comprising, monitor means for passing voltage peaks which exceed a preset voltage level, said monitor means having its input connected to said output transformer, amplifier means connected to the output of said monitor means, peak-detector means connected to the output of said amplifier means for providing a negative-direct voltage output proportional to the amplitude of its input signal, and the output of said peak-detector means connected to said variable-gain amplifier to control its gain inversely, to the magnitude of the peak-detector means output, whereby the voltage provided by said compensating transformer regulates the voltage provided from said output transformer.

2. A peak voltage regulator for providing an alternating output voltage having the same waveform as an input voltage source but having a substantially constant output peak amplitude, comprising first, second, and third transformers having their secondary, primary and secondary connected respectively in series to complete a circuit, said input voltage source connected to the primary of said first transformer, variable-gain amplifier means having its output connected to the primary of said third transformer and having its input coupled to said second transformer, monitor circuit means for providing a pulsed output having its input connected across a portion of said second transformer, means for providing a preset voltage level connected to said monitor circuit to maintain its pulsed output as the difference between its input voltage and the preset voltage level, means for amplifying and detecting said peak voltage output of said monitor circuit means to provide a direct-voltage output having an amplitude proportional to the amplitude of said pulses, the output of said detector means connected to said variable-gain amplifier means to control its gain inversely to changes in the amplitude of said pulses.

3. Peak-voltage regulator means comprising an input transformer, an output transformer, and a compensating transformer, a power source connected to the primary of said input transformer, a complete circuit provided by serially connecting the secondary of said input transformer, the primary of said output transformer, and the secondary of said compensating transformer, monitor circuit means for receiving an alternating current and passing that portion which exceeds a fixed reference voltage, the input to said monitor circuit means connected across a portion of said output transformer, direct-voltage regulator means for providing the fixed reference voltage to said monitor circuit means, a regulation amplifier receiving the output of said monitor circuit to provide an amplified output having negative polarity, detector means connected to the output of said regulation amplifier to provide a direct-voltage output of negative polarity having an amplitude proportional to the amplitude of its input voltage, variable-gain amplifier means having its gain controlled by said detected output voltage, the gain of said variable-gain amplifier decreasing as the negative detected voltage increases, the input to said variable-gain amplifier means tapped from said output transformer, and the primary of said compensating transformer connected to the output of said variable-gain amplifier means, whereby the compensating transformer injects a voltage which combines with the input voltage to provide a substantially constant peak output alternating voltage having the same waveform as said input voltage.

4. A peak-voltage regulator circuit comprising, an input transformer, an output transformer and a compensating transformer, an alternating-voltage source connected to the primary of said input transformer, the secondary of said input transformer connected in series with the primary of said output transformer and the secondary of said compensating transformer to complete a circuit, the primary and secondary of said output transformer each having a point connected to ground, a variable-gain amplifier having its input tapped to said output transformer and having its output serially connected to the primary of said compensating transformer, monitor circuit means having a high-impedance input connected across a portion of said output transformer for clipping its received voltage at a prefixed voltage level to provide a pulsed voltage output, a voltage-divider circuit connected between ground and a B-plus voltage supply, and a voltage-regulator electron tube connected with proper polarity across a portion of said voltage-divider circuit, said divider-circuit portion being tapped at a required voltage level to provide the substantially prefixed voltage level for said monitor circuit means, a regulation amplifier having its input connected to the pulsed output of said monitor circuit means to provide output pulses having a negative polarity, detector means connected to the output of said regulation amplifier to provide a direct-voltage output of negative polarity which varies with the amplitude of the pulses provided to said detector means, and the output of said detector connected to said variable-gain amplifier to control its gain, wherein its gain decreases with increased negative detected voltage, whereby said compensating transformer injects a compensating voltage which maintains the voltage output from said output transformer at a substantially constant peak value with a waveform identical with the source voltage waveform.

5. A peak-voltage regulator comprising an input transformer, an output transformer and a compensating transformer, an alternating-voltage power source connected to the primary of said input transformer, the secondary of said input transformer and the primary of said output transformer and the secondary of said compensating transformer connected in series to complete a circuit, the primary and secondary of said output transformer having one side connected to ground, a voltage-divider connected across the secondary of said output transformer, a variable-gain amplifier having its input connected to a tapped point on said voltage-divider and having its output connected across said compensating transformer primary, monitor-circuit means for clipping an input voltage at a preselected direct-voltage level to provide the peaks of said clipped voltage as a pulsed output, said monitor circuit having a high impedance input connected across the primary of said output transformer, a direct-voltage regulator circuit including a potentiometer, said potentiometer having an adjustable tap connected to said monitor circuit to provide it with the required preselected reference-voltage level, a regulating amplifier having its input connected to the pulsed output of said monitor circuit means, a peak detector connected to the output of said regulating amplifier to provide a negative direct-voltage output, and said variable-gain amplifier connected to the detector output to have its gain decreased by increases in negative detector output voltage, whereby said compensating transformer injects a voltage which maintains the alternating output voltage of the circuit at a substantially constant peak value.

6. A peak-voltage regulator comprising an input transformer, an output transformer and a compensating transformer, an alternating-voltage source connected to the input transformer primary, a complete circuit being provided by connecting in series the input transformer secondary, the output transformer primary, and the compensating transformer secondary; the primary and secondary of said output transformer having one side connected to ground, a variable-gain amplifier including at least one remote-cutoff electron tube, the output of said variable-gain amplifier connected serially with the primary of said compensating transformer, an output voltage-divider of large impedance connected across said secondary transformer, a charging capacitor connected between the control grid of said electron tube and a tap on said output voltage-divider, a direct-voltage regulator circuit comprising a second voltage-divider connected between ground and a B-plus voltage source, a voltage regulator tube operably connected across a portion of said second voltage-divider, said portion including an adjustable voltage tap-point, a first diode having its anode connected across said output transformer, a resistor connected between the cathode of said first diode and the tap point of said second voltage-divider, a second amplifier circuit, a blocking capacitor connected between the input to said second amplifier circuit and the cathode of said first diode, a second diode for detecting the output of said second amplifier circuit, a second resistor connected between ground and the cathode of said second diode, a third capacitor connected between the output of said second amplifier circuit and the cathode of said second diode, a third resistor connected between ground and the anode of said second diode, and the control grid of said electron tube in said variable-gain amplifier connected to the anode of said second diode, whereby the output of said output transformer secondary is maintained at a substantially constant peak value and has a waveform substantially the same as said alternating-voltage source.

No references cited.